United States Patent
Shigeyama et al.

(10) Patent No.: US 6,941,779 B2
(45) Date of Patent: Sep. 13, 2005

(54) STEERAGE LOCKING SYSTEM FOR VEHICLE

(75) Inventors: Katsuyoshi Shigeyama, Miyazaki (JP); Takeshi Taniguchi, Miyazaki (JP); Mitsuo Sasaki, Miyazaki (JP); Kentaro Yoshimura, Wako (JP); Tomoaki Nakai, Wako (JP); Kenichi Takizawa, Wako (JP); Masashi Suzuki, Wako (JP)

(73) Assignees: Kabushiki Kaisha Honda Lock, Miyazaki (JP); Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/628,585

(22) Filed: Jul. 29, 2003

(65) Prior Publication Data

US 2004/0129041 A1 Jul. 8, 2004

(30) Foreign Application Priority Data

Jul. 30, 2002 (JP) ........................................ 2002-221230
Jul. 30, 2002 (JP) ........................................ 2002-221320
Jul. 30, 2002 (JP) ........................................ 2002-221321

(51) Int. Cl.$^7$ ............................................ B60R 25/02
(52) U.S. Cl. ............................... 70/186; 70/252; 70/455
(58) Field of Search .................... 292/350; 70/182–186, 70/252, 444, 445, 423, 424, 427, 428, 454, 455

(56) References Cited

U.S. PATENT DOCUMENTS

| 3,023,602 | A | * | 3/1962 | Foote et al. | |
| 3,638,462 | A | * | 2/1972 | White et al. | 70/186 |
| 3,648,490 | A | * | 3/1972 | Kimberlin et al. | 70/186 |
| 4,118,962 | A | * | 10/1978 | Block et al. | |
| 4,262,508 | A | * | 4/1981 | Davidson | |
| 4,282,732 | A | * | 8/1981 | Bennett | |
| 4,676,084 | A | * | 6/1987 | Signorelli | 70/440 |
| 4,972,692 | A | * | 11/1990 | Morikawa et al. | 70/186 |
| 5,241,846 | A | * | 9/1993 | Hoke | 70/455 |
| 5,623,844 | A | * | 4/1997 | Draeger | |
| 5,656,867 | A | * | 8/1997 | Kokubu | 307/10.5 |
| 6,260,651 | B1 | * | 7/2001 | Kokubu et al. | 180/287 |
| 6,354,119 | B1 | * | 3/2002 | Molzer | |
| 6,370,929 | B1 | * | 4/2002 | Watanabe et al. | 70/423 |
| 6,389,856 | B1 | * | 5/2002 | Watanuki et al. | |
| 6,508,088 | B1 | * | 1/2003 | Barbier et al. | |
| 6,516,640 | B2 | * | 2/2003 | Jacobs et al. | 70/186 |
| 6,604,392 | B1 | * | 8/2003 | Kiso et al. | |
| 6,718,805 | B2 | * | 4/2004 | Okuno | |
| 6,751,991 | B2 | * | 6/2004 | Tamukai | |
| 6,796,153 | B2 | * | 9/2004 | Ochi | |
| 2002/0092332 | A1 | * | 7/2002 | Canard | |
| 2003/0233857 | A1 | * | 12/2003 | Chung | 70/186 |
| 2004/0003632 | A1 | * | 1/2004 | Ohtaki et al. | 70/252 |
| 2004/0107749 | A1 | * | 6/2004 | Yukihara et al. | 70/186 |

FOREIGN PATENT DOCUMENTS

JP          8-74683         9/1994

* cited by examiner

Primary Examiner—Suzanne Dino Barrett
(74) Attorney, Agent, or Firm—Arent Fox PLLC (57) ABSTRACT

In a steerage locking system for a vehicle, including a control knob mounted to a rotor capable of being turned from a LOCK position via an ACC position and an ON position to a START position, the control knob is detachably fastened to a front end of the rotor by a screw member from axially outside the rotor. Thus, the maintenance such as exchange of the control knob is facilitated.

5 Claims, 10 Drawing Sheets

STEERAGE LOCKING SYSTEM FOR VEHICLE

BACKGROUND OF THE INVENTION

1. Field of the Invention

The present invention relates to a steerage locking system for a vehicle, and particularly to an improvement in a steerage locking system for a vehicle, comprising a control knob mounted to a rotor capable of being turned from a LOCK position via an ACC position and an ON position to a START position.

2. Description of the Related Art

A conventional system is already known, for example, from Japanese Patent Publication No.6-74683 and the like.

In the conventional system, however, a control knob is integrally formed on a rotor, and when the maintenance of the control knob or a part disposed behind the control knob is carried out, it is disadvantageously necessary to remove the control knob along with the rotor. There is also a steerage locking system in which a control knob is mounted to a rotor by press-fitting or by claw-engagement. In both cases, however, the control knob cannot be removed easily.

SUMMARY OF THE INVENTION

Accordingly, it is an object of the present invention to provide a steerage locking system for a vehicle, wherein the maintenance such as exchange of the control knob and the like can be carried out easily.

To achieve the above object, according to a first feature of the present invention, there is provided a steerage locking system for a vehicle, comprising a control knob mounted to a rotor capable of being turned from a LOCK position via an ACC position and an ON position to a START position, wherein said control knob is detachably fastened from axially outside to a front end of said rotor by a screw member.

With such arrangement of the first feature, the control knob can be easily removed from the rotor by loosening the screw member from outside the control knob, whereby the maintenance of the control knob and the like can be facilitated.

According to a second feature of the present invention, in addition to the arrangement of the first feature, a cover member is detachably mounted from outside to the control knob to cover the screw member. With such arrangement, the appearance can be improved by covering the screw member.

According to a third feature of the present invention, in addition to the arrangement of the second feature, the control knob has an opening leading to a keyhole which is provided in the rotor so that a mechanical key can be inserted into the keyhole; and the cover member inserted into the opening and having a guide bore for guiding the insertion of the mechanical key into the keyhole is detachably mounted to the control knob to cover the screw member disposed within the opening. With such arrangement, the appearance can be further improved by ensuring that the screw member and the cover member are accommodated in the control knob, and the insertion of the mechanical key into the keyhole is facilitated by guiding the mechanical key along the guide bore in the cover member.

According to a fourth feature of the present invention, in addition to the arrangement of the first feature, the rotor having a keyhole, into which a mechanical key can be inserted, is relatively turnably inserted into a cylinder which is turnably carried in a stationary housing; a plurality of tumblers are built in the rotor and biased by a spring in a direction of engagement with the cylinder in such a manner that the engagement with the cylinder is released in response to the insertion of the normal mechanical key into the keyhole; and a key insertion-restraining means is mounted on the rotor and adapted to permit the insertion of the mechanical key into the keyhole in a state in which the rotor is in the LOCK position, but to inhibit the insertion of the mechanical key into the keyhole when the rotor has been turned from the LOCK position using the control knob.

With such arrangement of the fourth feature, when the rotor has been turned from the LOCK position by the control knob, the insertion of the mechanical key into the keyhole is inhibited by the key insertion-restraining means. Therefore, the mechanical key cannot be erroneously inserted upon turning the rotor by the control knob, and thus the possibility of the occurrence of the erroneous operation due to the insertion of the mechanical key can be eliminated.

According to a fifth feature of the present invention, in addition to the arrangement of the fourth feature, the key insertion-restraining means comprises: a slider which is mounted to the rotor so that it can be slid between an insertion-permitting position for permitting the insertion of the mechanical key into the keyhole and an insertion-inhibiting position for inhibiting the insertion of the mechanical key into the keyhole, while being biased toward the insertion-inhibiting position, and so that an urging force from the mechanical key toward the insertion-permitting position is applied to the slider in response to the insertion of the mechanical key into the keyhole; and a sliding-movement restraining member which is mounted to the rotor so that the sliding of the slider to the insertion-permitting position is permitted in the state in which the rotor is in the LOCK position, but the sliding of the slider to the insertion-permitting position is inhibited when the rotor has been moved from the LOCK position. With such arrangement, the key insertion-restraining means can be constituted simply by the slider and the sliding-movement restraining member.

According to a sixth feature of the present invention, in addition to the arrangement of the first feature, the control knob has an opening leading to a keyhole which is provided in the rotor so that a mechanical key can be inserted into the keyhole; a knob cap is detachably mounted to the control knob so that it is fitted into the opening to close the keyhole; and a resilient portion is integrally formed at a tip end of the knob cap to resiliently contact with an inner surface of an end of the opening adjacent the keyhole.

With such arrangement of the sixth feature, the knob cap closing the keyhole is fitted into the opening which is provided in the control knob and leads to the keyhole in the rotor. Therefore, when the mechanical key is not used, the keyhole becomes invisible by closing the keyhole by the knob cap, leading to an improvement in appearance. Moreover, the knob cap is fitted into the opening in such a manner that the resilient portion resiliently contacts the inner surface of the end of the opening adjacent the keyhole. Therefore, the knob cap can be guided, while providing a moderate resistance feeling during the mounting of the knob cap to the control knob, and moreover it is possible to suppress the chattering of the knob cap within the control knob upon mounting the knob cap to the control knob.

The above and other objects, features and advantages of the invention will become apparent from the following description of the preferred embodiment taken in conjunction with the accompanying drawings.

BRIEF DESCRIPTION OF THE DRAWINGS

FIG. 7 is a sectional view similar to FIG. 2, but in a state in which the control knob has been pushed in.

DESCRIPTION OF THE PREFERRED EMBODIMENT

Figure 1:
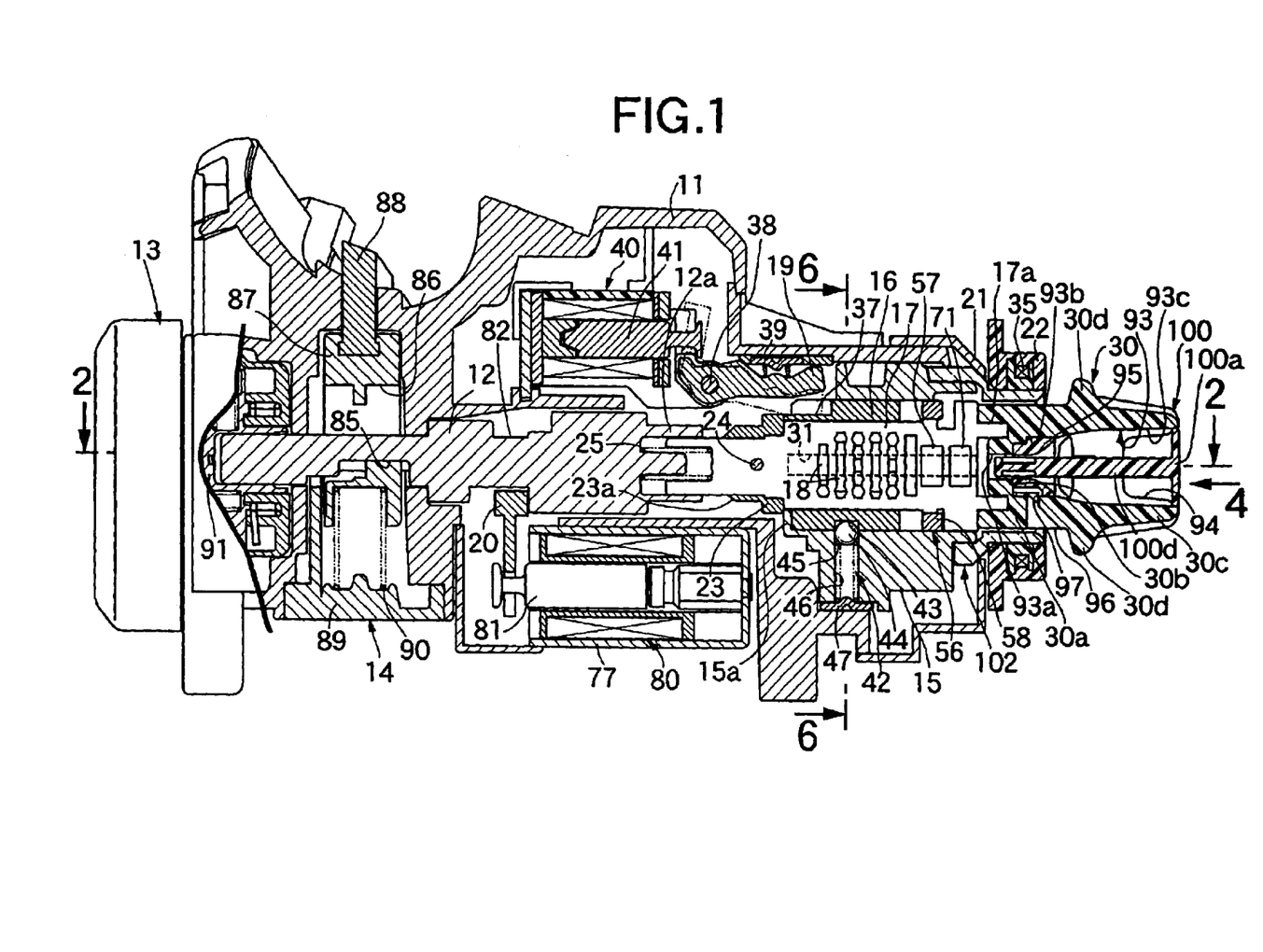
FIG. 1 is a vertical sectional side view of a steerage locking system for a vehicle when a mechanical key is not used.
Figure 2:
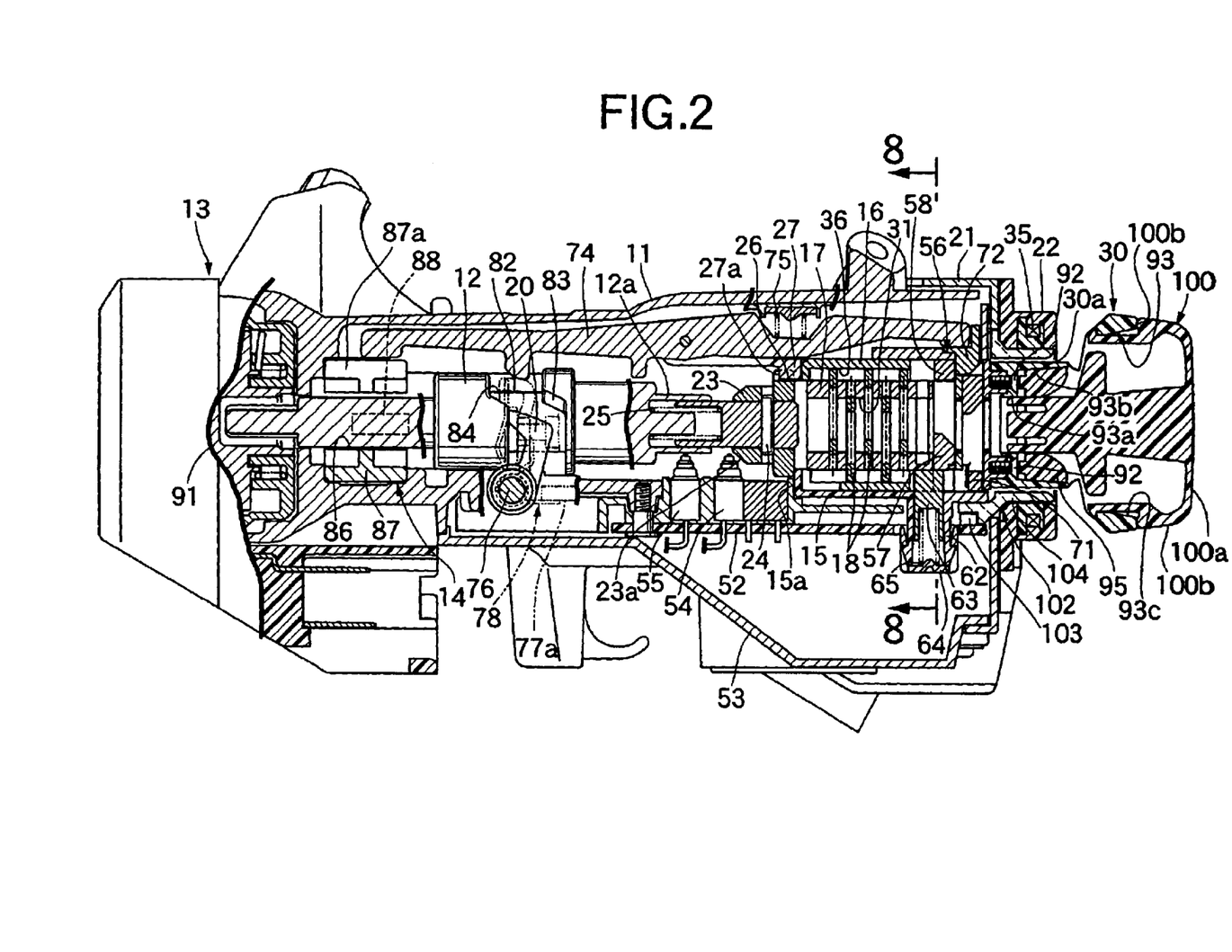
FIG. 2 is a sectional view taken along a line 2—2 in FIG. 1.

The present invention will now be described by way of a preferred embodiment with reference to FIGS. 1 to 10. Referring first to FIGS. 1 and 2, a steerage locking system includes a body 11 made of a metal and mounted to a steering column (not shown), a cooperative turn shaft 12 turnably supported in the body 11, a rotary switch 13 mounted to a rear end of the body 11 and connected a rear end (a left end in FIGS. 1 and 2) of the cooperative turn shaft 12, a locking mechanism 14 capable of being switched over between a locking state inhibiting the turning of a steering shaft (not shown) and a unlocking state permitting the turning of the steering shaft in response to the turning of the cooperative turn shaft 12, a housing 15 disposed in a front portion of the body 11 in front of the cooperative turn shaft 12 to be fixed thereto, a cylinder 16 turnably supported in the housing 15, a rotor 17 which is disposed coaxially with the cooperative turn shaft 12 and relatively turnably inserted into the cylinder 16 and which is relatively non-turnably fitted at its rear end into a front end of cooperative turn shaft 12, a plurality of tumblers 18 built in the rotor 17 so that they can be switchably engaged with and disengaged from the cylinder 16, a first block lever 19 capable of engaging with the cylinder 16 to inhibit the turning of the cylinder 16, and a second block lever 20 capable of engaging with the cooperative turn shaft 12 to inhibit the turning of the cooperative turn shaft 12.

Figure 3:
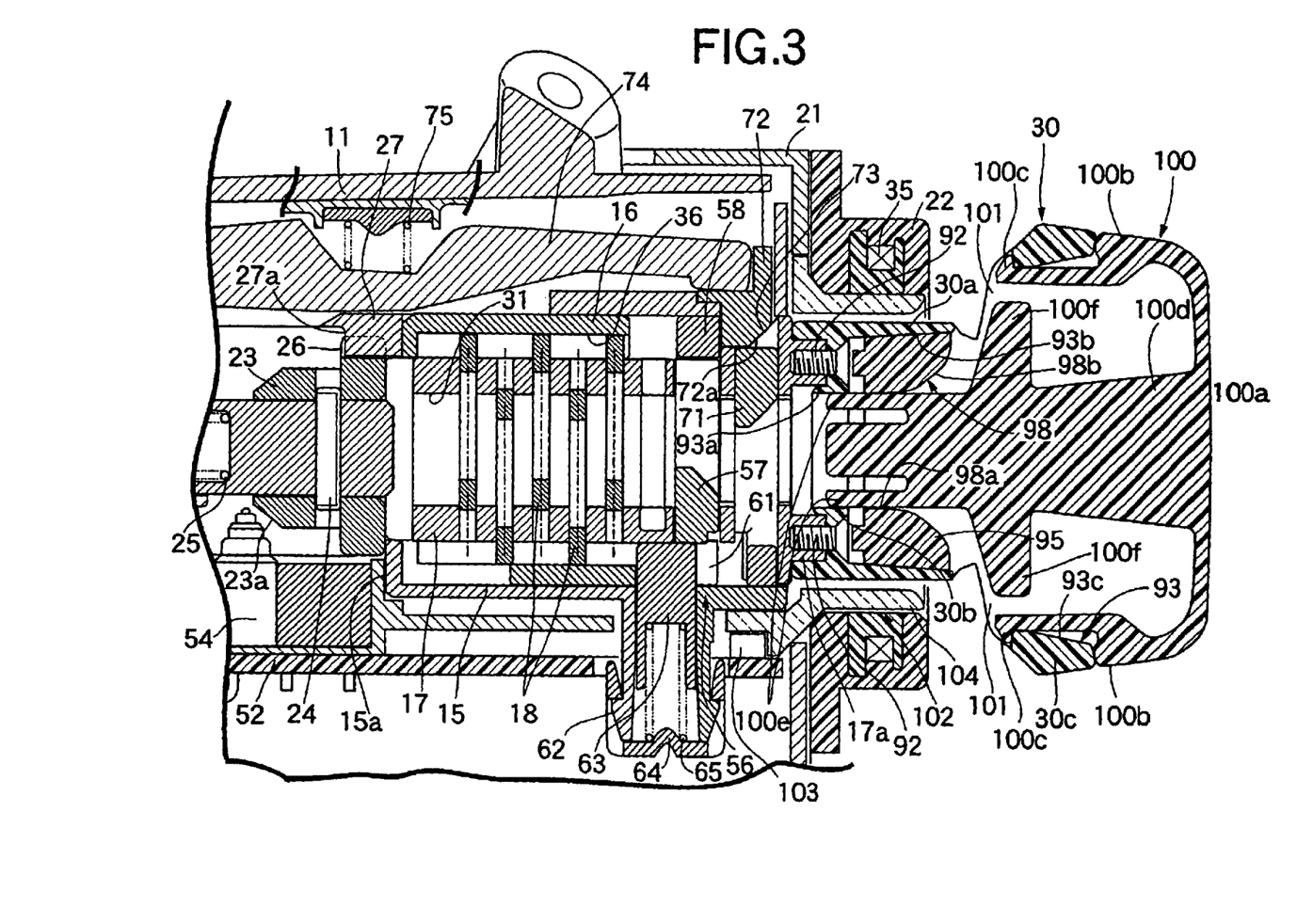
FIG. 3 is an enlarged view of essential portions of FIG. 2.

Referring also to FIG. 3, a cover 21 for covering a front end of the housing 15 is mounted to a front end of the body 11. A ring member 22 made of a synthetic resin is mounted to the cover 21 to cover the cover 21.

Figure 4:
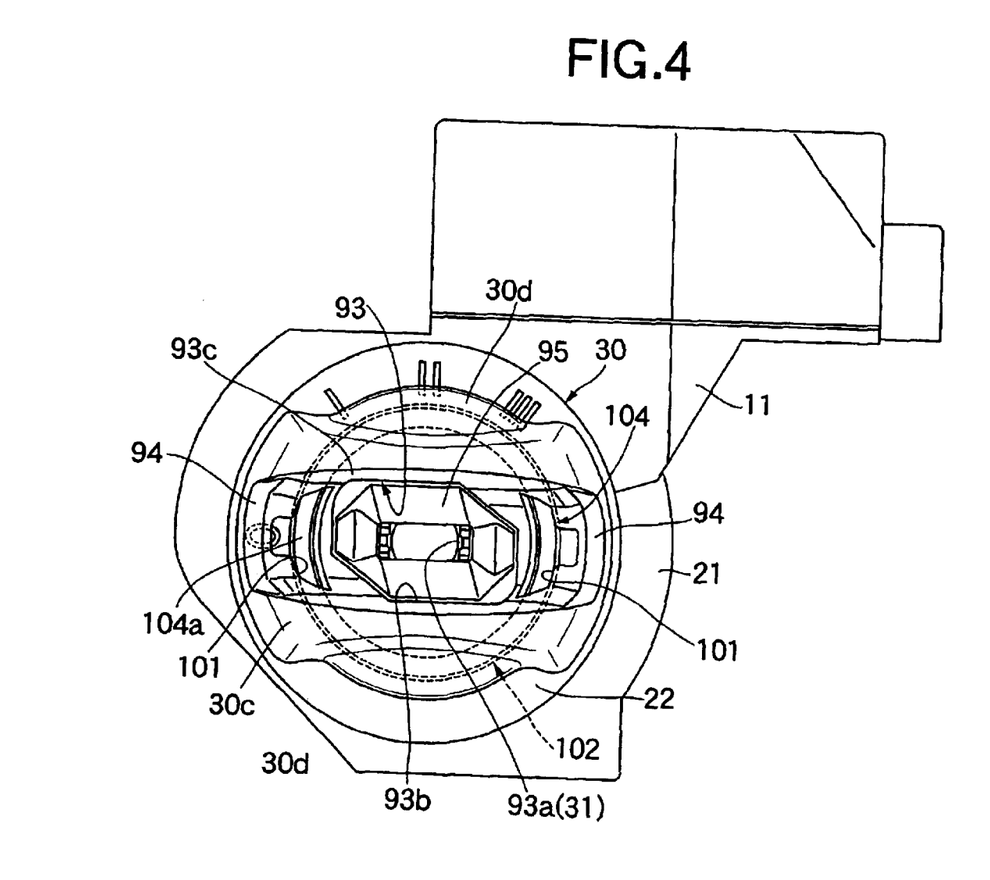
FIG. 4 is a view taken in a direction of an arrow 4 in a state in which a knob cap has been removed.

Referring to FIG. 4, the following positions are indicated at circumferential distances on a front surface of the ring member 22: a "0" position which is a LOCK position for bringing the locking mechanism 14 into a locking state; an "I" position which is an ACC position in which an electric power can be supplied to an auxiliary other than an engine; a "II" position which is an ON position for bringing the engine into a turned-on state; and a "III" position which is a START position for starting the engine.

A ring-shaped collar 23 is fixed to the rotor 17 in the rear of the housing 15 by a spring pin 24. A rear end of the rotor 17 protruding behind the collar 23 is connected in an operatively associated manner to a front end of the cooperative turn shaft 12 so that it can be relatively axially moved in a limited range, but it is inhibited from being relatively turned about an axis. A spring 25 for biasing the rotor 17 forwards is mounted between the cooperative turn shaft 12 and the rotor 17.

The housing 15 is provided at its rear end with a collar portion 15a which thrustingly supports a rear end of the cylinder 16. A limit of forward movement of the rotor 17 biased forwards by the spring 25 is defined by the abutment of the collar 23 against the collar portion 15a at the rear end of the housing 15.

A restraining groove 26 is provided on an outer periphery of the collar 23 to extend axially. An engagement protrusion 27 is provided at the rear end of the housing 15 and adapted to be engaged into the restraining groove 26 to inhibit the turning of the rotor 17 in a state in which the rotor 17 at the LOCK position is at the forward movement limit with the collar 23 abutting against the collar portion 15a. Therefore, when the rotor 17 is turned from the LOCK position to the ACC position, it is necessary to push in the rotor 17 against the spring force of the spring 25 to a position in which the engagement protrusion 27 is disengaged from the restraining groove 26. Moreover, when the pushed-in rotor 17 is turned toward the ACC position, the rotor 17 is turned with a front surface of the collar 23 being in sliding contact with a cam face 27a formed on a rear surface of the engagement protrusion 27. The cam face 27a is formed to guide the rotor 17 with the collar 23 being in sliding contact with the cam face 27a so that the rotor 17 is returned to a position taken before the pushing operation in response to the rotor 17 turning from the ACC position to the ON position.

Namely, the operation for pushing the rotor 17 is required for turning the rotor 17 from the LOCK position to the ACC position, and the rotor 17 is advanced to the original position in response to the further turning from the ACC position toward the ON position. On the other hand, when the rotor 17 is turned from the ON position through the ACC position toward the LOCK position, an operation for pushing the rotor 17 against the spring force of the spring 25 is required.

A control knob 30 is mounted to the front end of the rotor 17, so that when the operation by the control knob 30 is permitted, the rotor 17 can be turned from the LOCK position via the ACC position and the ON position to the START position by grasping and manually operating the control knob 30.

Figure 5:
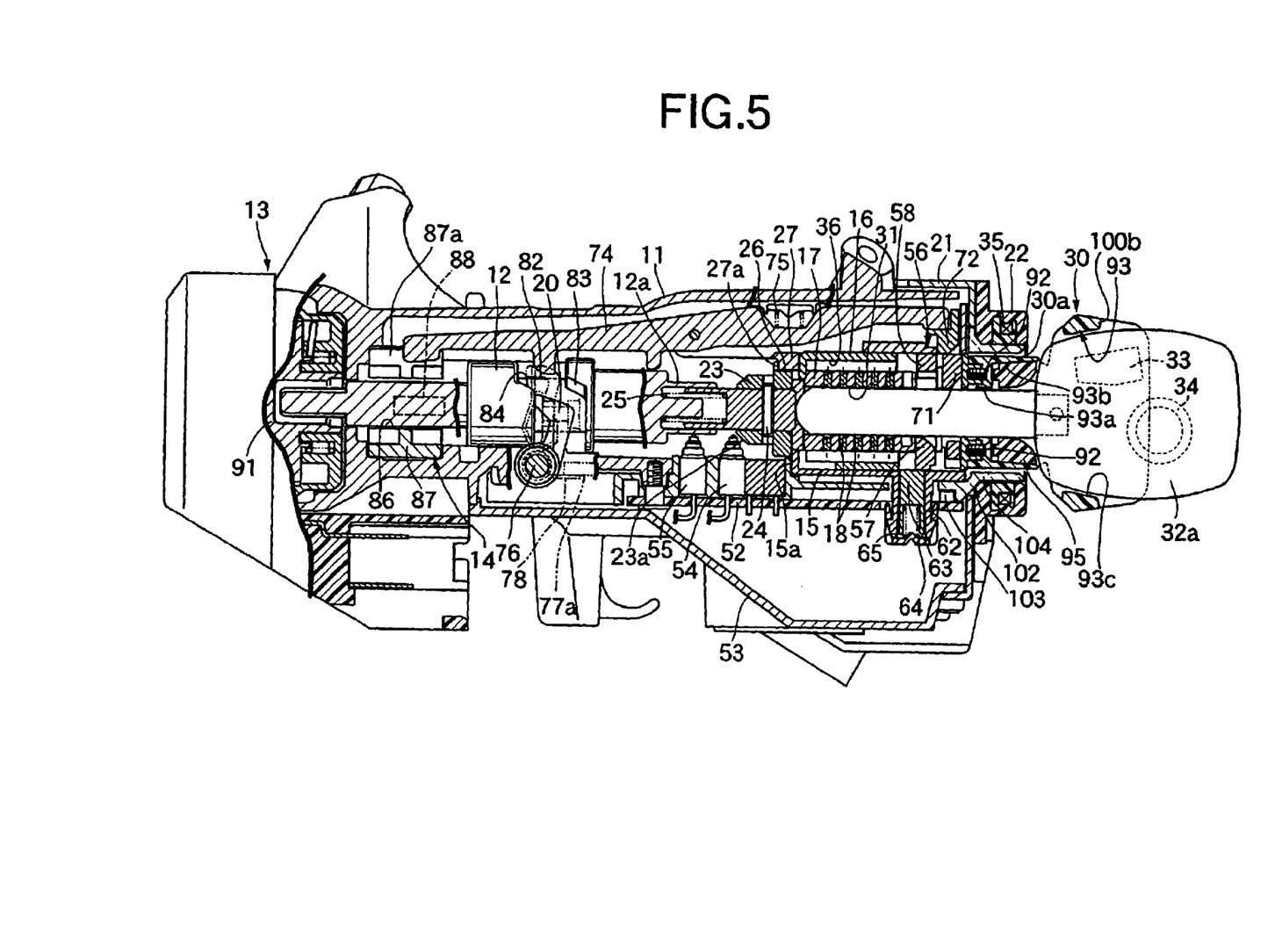
FIG. 5 is a sectional view similar to FIG. 2, but in a state in which the mechanical key has been inserted.

The rotor 17 is provided with a bottomed keyhole 31 whose front end opening faces the front end of the rotor 17, as shown in FIG. 5. The cross-sectional shape of the keyhole 31 is a rectangular shape such that it extends a long distance along one diametrical line in order to permit the insertion of a mechanical key into the keyhole 31.

A transponder 33 and a cell 34 are built in a grip 32a of the mechanical key 32. On the other hand, an antenna 35 for communicating with the transponder 33 upon the insertion of the mechanical key 32 into the keyhole 31 is built in the ring member 22. When the mechanical key 32 is used, the starting of the engine is possible only when it has been confirmed, based on the communication between the transponder 33 and the antenna 35, that the mechanical key 32 is a normal mechanical key.

The tumblers 18 are built in the rotor 17 at a plurality of points axially spaced apart from one another, while being biased radially outwards by a spring. A plurality of tumbler-engagement grooves 36 are provided in an inner surface of the cylinder 16 to extend axially so that the tumblers 18 are engaged into the tumbler-engagement grooves 36. When the normal mechanical key 32 has been inserted into the keyhole 31 in the rotor 17, the tumblers 18 are moved to positions in which they are disengaged from the tumbler-engagement grooves 36, whereby the turning of the rotor 17 is permitted. On the contrast, in a state in which the normal mechanical key 32 is not inserted into the keyhole 31, the tumblers 18 remain engaged in the tumbler-engagement grooves 36, so that the axial movement of the rotor 17 relative to the cylinder 16 is permitted, but the turning of the rotor 17 relative to the cylinder 16 is inhibited.

The cylinder 16 is provided at its rear portion with a lever-engagement groove 37 into which the first lever 19 is brought into engagement to inhibit the turning of the cylinder 16, when the rotor 17 is in the LOCK position in a state in which it cannot be turned relative to the cylinder 16 by the engagement of the tumblers 18 with the cylinder 16. The first block lever 19 is turnably supported in the body 11 through a support shaft 38, so that it can be switched over between a state in which one end thereof is in engagement in the lever-engagement groove 37 in the cylinder 16 to inhibit the turning of the cylinder 16 about the axis, as shown by a solid line in FIG. 1, and a state in which it is out of engagement in the lever-engagement groove 37 to permit the turning of the cylinder 16 about the axis, as shown by a dashed line in FIG. 1. A spring 39 for biasing the first block lever 19 in a direction of engagement with the cylinder 16 is mounted under compression between the body 11 and the first block lever 19.

A tip end of a plunger 41 of a first solenoid 40 is inserted through and engaged in the other end of the first block lever 19, so that when the first solenoid 40 pulls in the plunger 41 in its energized state, the first block lever 19 is turned against a spring force of the spring 39 to a side in which it is disengaged from the lever-engagement groove 37 in the cylinder 16.

The energization of the first solenoid 40 is controlled by a control circuit (not shown), which is adapted to energize the first solenoid 40, when it has been judged that the turning of the cylinder 16 is permitted in response to the confirmation of the identification of an ID code in a communication between a vehicle and a mobile instrument carried by a vehicle user, the communication being conducted upon pushing the control knob 30 as a trigger, thereby permitting the turning of the cylinder 16.

Figure 6A:
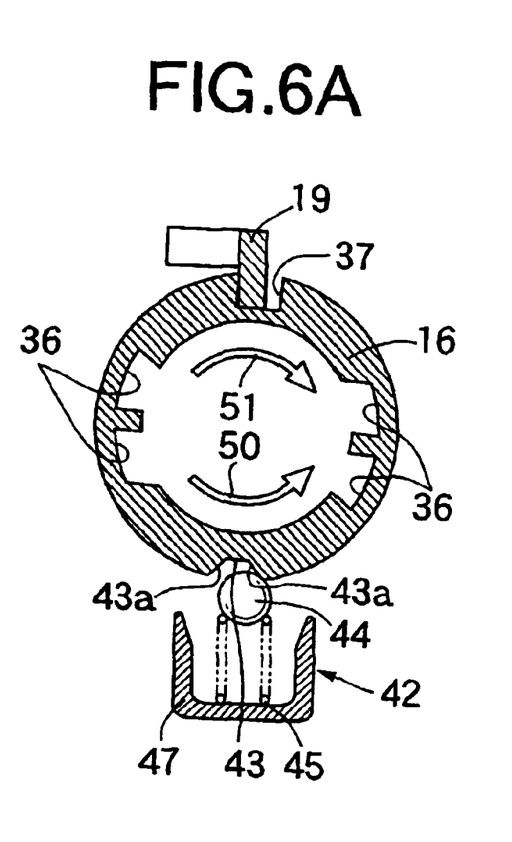
FIG. 6 is a sectional view of a housing and a cylinder, taken along a line 6—6 in FIG. 1 for explaining the function of a positioning means.
Figure 6B:
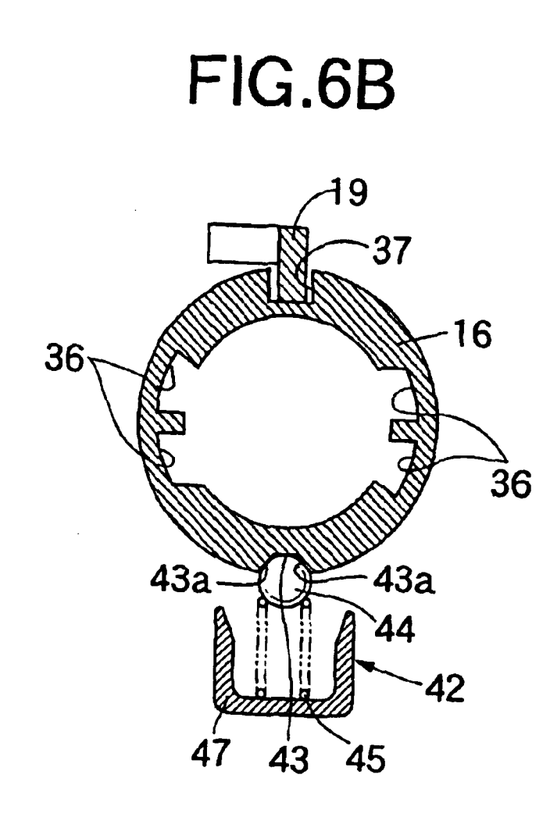

Referring also to FIG. 6, the position of the cylinder 16 around the turning axis when the rotor 17 incapable of being turned relative to the cylinder 16 due to the engagement of the tumblers 18 with the cylinder 16 is in the LOCK position, i.e., the position in which the first block lever 19 can be engaged in the lever-engagement groove 37, is determined by a positioning means 42.

The positioning means 42 is comprised of a fitting recess 43 of a substantially V-shape provided around the outer periphery of the cylinder 16 and having inclined faces 43a, 43a on circumferentially opposite sides of the cylinder 16, a sphere 44 capable of being fitted into the fitting recess 43 while contacting both the inclined faces 43a, 43a, and a spring 45 for exhibiting a resilient force for biasing the sphere 44 toward the fitting recess 43. The sphere 44 is accommodated in a guide bore 46 provided in the housing 15. The coil-shaped spring 45 is mounted under compression between the sphere 44 and a lid member 47 mounted to the housing 15 to close an outer end of the guide bore 46.

In the positioning means 42, when the rotor 17 is in the LOCK position, the sphere 44 is fitted into the fitting recess 43 by the spring force of the spring 45; and when the sphere 44 is put into contact with either one of the inclined faces 43a, 43a on the opposite sides of the fitting recess 43, e.g., the right inclined face 43a, a counterclockwise force shown by an arrow 50 in FIG. 6a is applied to the cylinder 16, and when the sphere 44 is put into contact with the left inclined face 43a, a clockwise force shown by an arrow 51 is applied to the cylinder 16. Thus, the position of the cylinder 16 around the turning axis when the rotor 17 is in the LOCK position is determined at a location in which the clearances between the opposite sides of the first block lever 19 and the side face of the lever-engagement groove 37 are equal.

Figure 7:
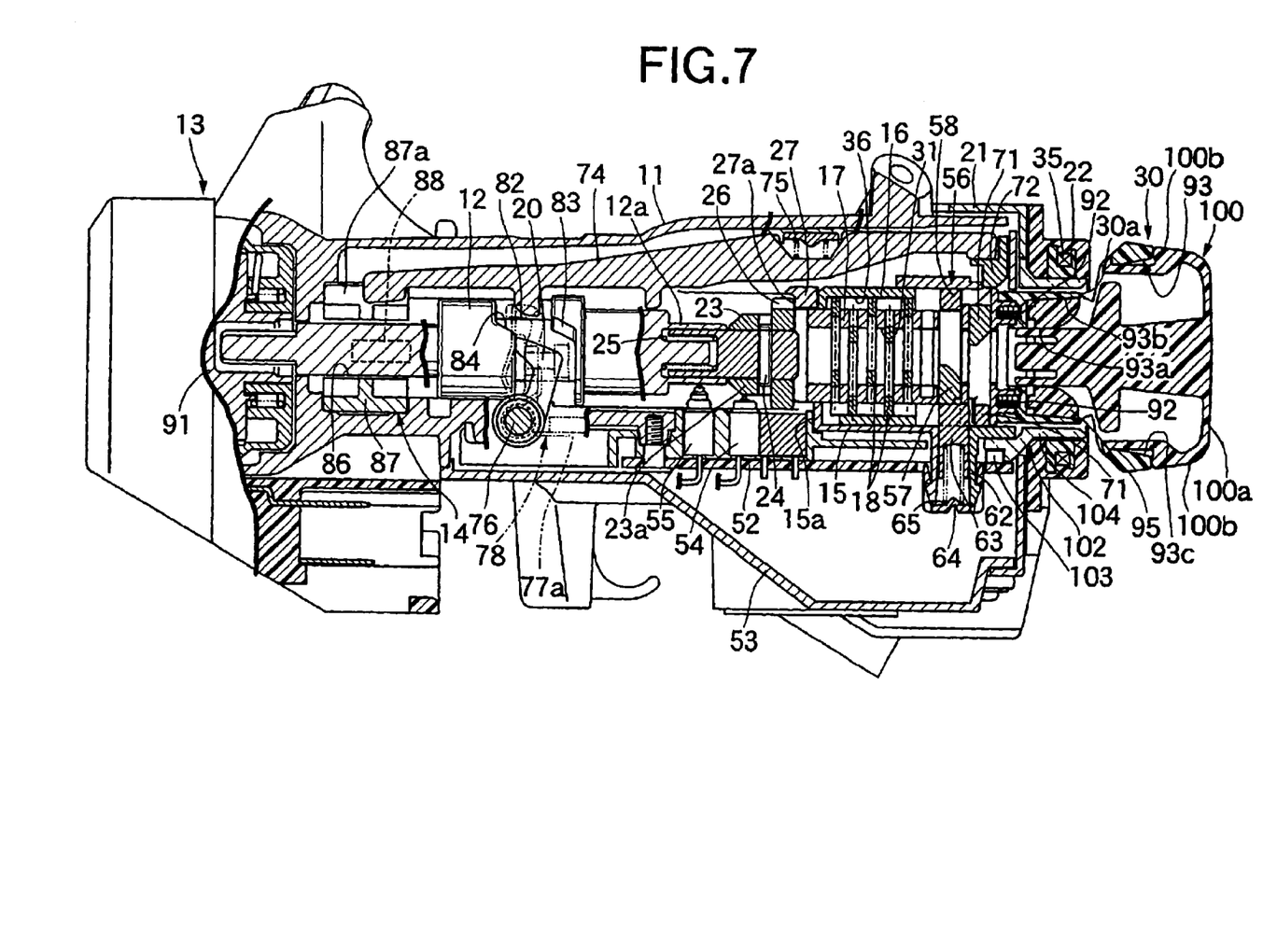

A control substrate 52 is mounted to the body 11 so that it is disposed outside the housing 15. A protective cover 53 is mounted to the body 11 to cover the control substrate 52. A knob switch 54 for detecting that the control knob 30 has been pushed in as shown in FIG. 7 is mounted to the control substrate 52 so that it is turned on by pushing the knob switch 54 by a tapered urging face 23a provided on the collar 23. In response to the turning-on of the knob switch 54, a signal is transmitted from a transmitter or the like built in an instrument panel (not shown) of the vehicle to the mobile instrument carried by the vehicle user, to urge the transmission of the ID code. If the ID code is identified, the turning of the cylinder 16, i.e., the turning operation of the control knob 30 mounted to the rotor 17 incapable of being turned relative to the cylinder 16 is permitted.

A turning-detecting switch 55 is mounted on the control substrate 52 adjacent and behind the knob switch 54. The turning-detecting switch 55 contacts with an outer surface of a connecting tube 12a which is coaxially provided at a front end of the cooperative turn shaft 12 in such a manner that the rear end of the rotor 17 is fitted into the connecting tube 12a for non-turning and for axial relative movement. An outer surface of the connecting tube 12a is formed so that the distance from an axis changes in response to the turnings of the rotor 17 and the cooperative turn shaft 12. Thus, the switching mode of the turning-detecting switch 55 is changed in response to the turnings of the rotor 17 and the cooperative turn shaft 12.

Referring also to FIG. 8, a key insertion-restraining means 56 is mounted at the front portion of the rotor 17 and adapted to permit the insertion of the mechanical key 32 into the keyhole 31 in the state in which the rotor 17 is in the LOCK position, but to inhibit the insertion of the mechanical key 32 into the keyhole 31 when the rotor 17 has been turned from the LOCK position to the ACC position, using the control knob 30.

The key insertion-restraining means 56 comprises: a slider 57 which is mounted to the rotor 17 so that it can be slid between an insertion-permitting position for permitting the insertion of the mechanical key 32 into the keyhole 31 and an insertion-inhibiting position for inhibiting the insertion of the mechanical key 32 into the keyhole 31, while being biased toward the insertion-inhibiting position, and so that an urging force from the mechanical key 22 toward the insertion-permitting position is applied to the slider 57 in response to the insertion of the mechanical key 32 into the keyhole 31; and a sliding-movement restraining member 58 which is mounted to the rotor 17 so that the sliding of the slider 57 to the insertion-permitting position is permitted in the state in which the rotor 17 is in the LOCK position, but the sliding of the slider 57 to the insertion-permitting position is inhibited when the rotor 17 has been moved from the LOCK position.

A first slide bore 59 is provided in the front portion of the rotor 17 to extend across the keyhole 31 in a direction along one diametrical line of the rotor 17. The slider 57 is fitted into the first slide bore 59 for sliding between the insertion-permitting position in which one end thereof protrudes from the rotor 17, and the insertion-inhibiting position in which one end face thereof is flush with the outer surface of the rotor 17.

A key insertion opening 60 for permitting the insertion of the mechanical key 32 is provided in the slider 57 so that it is positioned to correspond to the keyhole 31 in the insertion-permitting position and it is offset from the keyhole 31 in the insertion-inhibiting position.

The sliding-movement restraining member 58 is formed into a ring shape surrounding the rotor 17, and is fitted into the housing 15 so that it can be turned relative to the rotor 17 in a space where the first slide bore 59 is provided. A restraining bore 61 is provided in the sliding-movement restraining member 58 to extend between inner and outer surfaces of the sliding-movement restraining member 58, so that one end of the slider 57 lying in the insertion-permitting position can be engaged into the restraining bore 61.

Figure 8A:
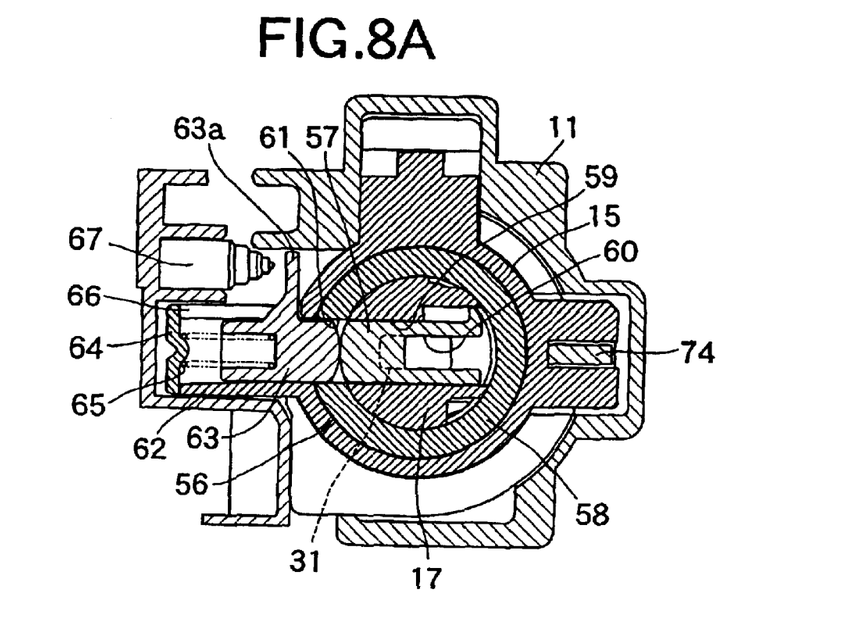
FIG. 8 is a sectional view taken along a line 8—8 in FIG. 2 and showing the structure of a key insertion-restraining means when the mechanical key is not used.

On the other hand, a guide tube 62 is integrally provided on the housing 15, so that it leads to the restraining bore 61 when the rotor 17 is in the LOCK position, as shown in FIG. 8A. An inner end of a key switch slider 63 slidably received in the guide tube 62 abuts against one end of the slider 57 when the rotor 17 is in the LOCK position. Moreover, a spring 65 is mounted under compression between a cap 64 closing an outer end of the guide tube 62 and the key switch slider 63, so that the key switch slider 63 is biased by the spring 65 in a direction to abut against the slider 57, and the slider 57 is biased toward the insertion-inhibiting position by a spring force of the spring 65 in a state in which the key switch slider 63 and the slider 57 are in abutment against each other.

Figure 8B:
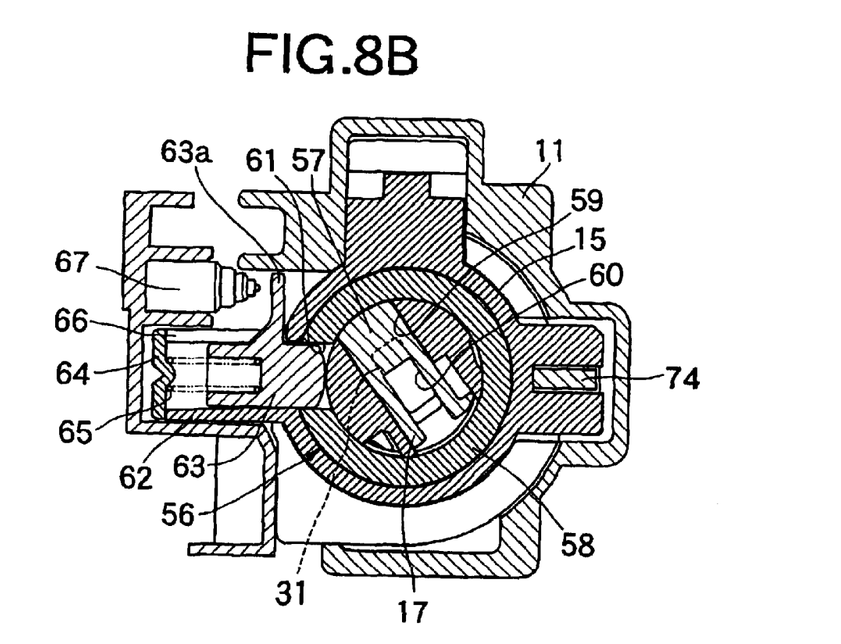

Thus, when the rotor 17 is in the LOCK position as shown in FIG. 8A, contact surfaces of the key switch slider 63 and the slider 57 are flush with the outer surface of the rotor 17. When the rotor 17 is turned from the LOCK position to the ACC position as shown in FIG. 8B by the control knob 30, the slider 57 is turned along with the rotor 17, while remaining in the insertion-inhibiting position. Therefore, when the rotor 17 is turned from the LOCK position to the ACC position by the control knob 30, it is impossible to insert the mechanical key 32 into the keyhole 31 in the rotor 17.

Figure 9A:
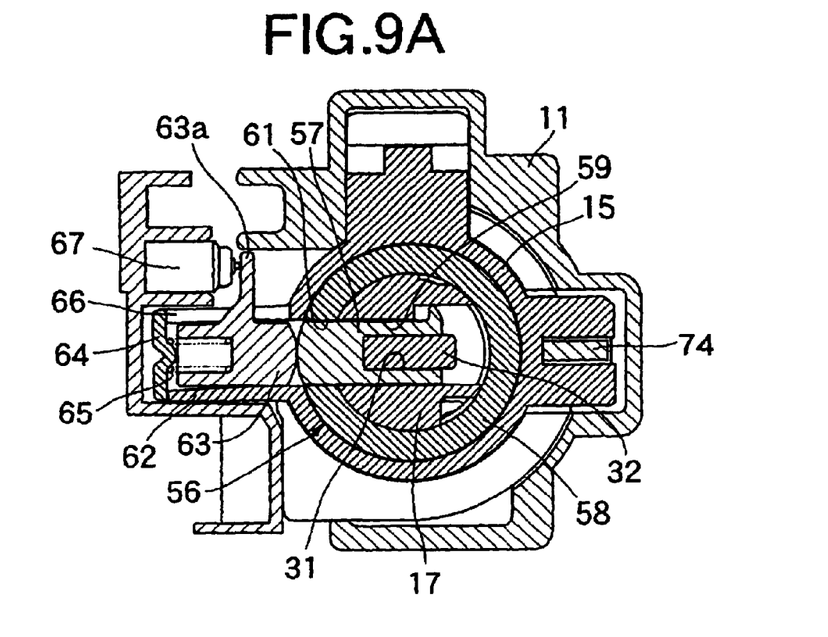
FIG. 9 is a sectional view taken along a line 9—9 in FIG. 5 and showing the structure of the key insertion-restraining means when the mechanical key is not used.
Figure 9B:
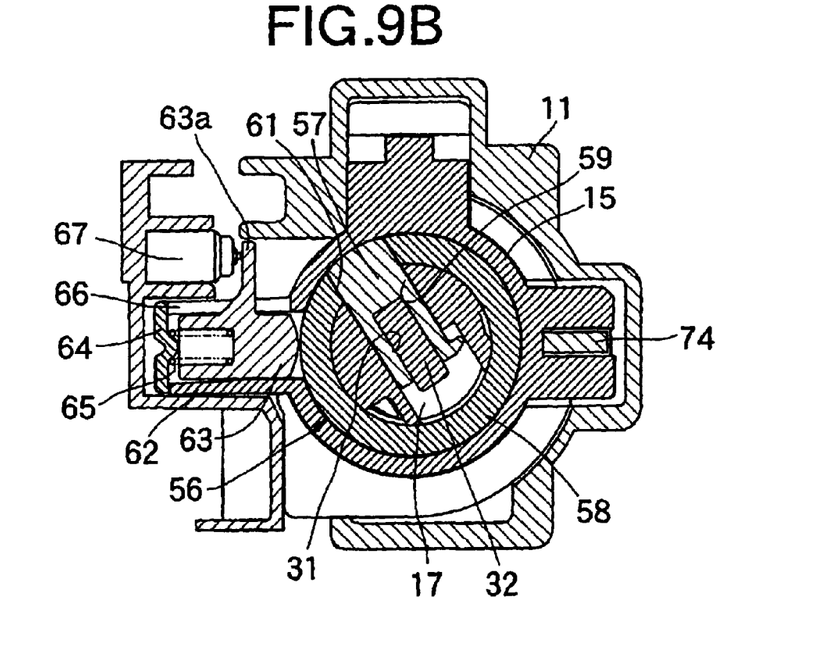

On the other hand, when the mechanical key 32 is inserted into the keyhole 31 in the rotor 17 which is in the LOCK position, as shown in FIG. 9A, an urging force is applied from the mechanical key 32 to the slider 57 toward the insertion-permitting position, whereby one end of the slider 57 is brought into engagement in the restraining bore 61 in the sliding-movement restraining member 58, so that the contact surfaces of the slider 57 and the key switch slider 63 are flush with the outer surface of the sliding-movement restraining member 58. Therefore, when the rotor 17 is turned from the LOCK position with the mechanical key 32 being inserted into the keyhole 31, the slider 57 is turned along with the rotor 17, while being in sliding contact with the inner surface of the housing 15, and the key switch slider 63 is brought into sliding contact with the outer surface of the sliding-movement restraining member 58, as shown in FIG. 9B.

The key switch slider 63 is integrally provided with an arm 63a which protrudes to the outside from a window 66 provided in a sidewall of the guide tube 62. A key switch 67 is mounted to the control substrate 52 and adapted to detect the arm 63a, as the slider 57 is slid to the insertion-permitting position in response to the insertion of the mechanical key 32 into the keyhole 31.

A first key slider 71 is slidably mounted to the front portion of the rotor 17 in front of the slider 57, so that it is slid in one direction along one diametrical line of the rotor 17 by the insertion of the mechanical key 32 into the keyhole 31. A second key slider 72 is slidably mounted at the front portion of the housing 15, so that it is urged by the first key slider 71 upon the insertion of the mechanical key 32 into the keyhole 31.

Moreover, an inclined face 72 is formed at an end of the second key slider 72 adjacent the first key slider 71, and inclined so that it is going away from the first key slider 71 toward the front. An inclined face 73 is provided on the rotor 17 and adapted to contact the inclined face 72a upon pushing in the rotor 17 by the control knob 30, thereby urging the second key slider 72 in a direction away from the rotor 17.

Namely, either when the mechanical key 32 is inserted into the keyhole 31 and when the rotor 17 is pushed in by the control knob 30 without insertion of the mechanical key 32 into the keyhole 31, the second key slider 72 is urged in the direction away from the rotor 17.

A front end of an operating lever 74 extending longitudinally within the body 11 and turnably supported in the body 11, is disposed outside the second key slider 72. The operating lever 74 is biased in a direction of abutment at its front end against the second key slider 72 by a spring force of a spring 75 interposed between the operating lever 74 and the body 11. The operating lever 74 is turned in a direction opposite from the direction in which it is biased by the spring 75, in response to sliding of the second key slider 72 in a radially outward direction of the rotor 17.

The second block lever 20 is capable of being turned between an engaged position in which it is engaged with an axially intermediate portion of the cooperative turn shaft 12 to inhibit the turning of the rotor 17 from the ACC position to the LOCK position and a disengaged position in which it is disengaged from the cooperative turn shaft 12 to permit the turning of the rotor 17 from the ACC position to the LOCK position. The second block lever 20 is turnably supported on a support shaft 76 mounted in the body 11 and having an axis perpendicular to a plane including an axis of the cooperative turn shaft 12. A return spring 78 which is a torsion spring is mounted between the second block lever 20 and a receiving portion 77a provided on a solenoid housing 77 mounted to the body 11, and surrounds the support shaft 76 so that it biases the second block lever 20 toward the disengaged position.

A second solenoid 80 having an operational axis parallel to the cooperative turn shaft 12 is accommodated and fixed in the solenoid housing 77, and adapted to be brought into an energized state when a shift lever (not shown) is in a position other than a parking position.

A plunger 81 of in the second solenoid 80 and the second block lever 20 are operatively connected to each other so that the plunger 81 is operated toward a retracted position in response to the operation of the second block lever 20 from the disengaged position to the engaged position. In a deenergized state of the second solenoid 80, the plunger 81 is brought into a protruding position in response to the turning of the second block lever 20 from the engaged position to the disengaged position by the spring force of the return spring 78. In the energized state of the second solenoid 80, the second solenoid 80 exhibits an attracting force for retaining the plunger 81 at the retracted position against the spring force of the return spring 78.

An accommodating groove 82 is formed in a continuously annular shape around the outer periphery of the intermediate portion of the cooperative turn shaft 12. A restraining face 83 is provided on a portion of a side of the cooperative turn shaft 12 in front of the accommodated groove 82, and adapted to inhibit the turning of the cooperative turn shaft 12 from the ACC position to the LOCK position by engagement with the second block lever 20 which is in the engaged position.

A cam face 84 is provided on a portion of a side of the cooperative turn shaft 12 in the rear of the accommodating groove 82, so that it is brought into abutment against the second block lever 20 which is in the disengaged position in response to the movements of the rotor 17 and the cooperative turn shaft 12 from the LOCK position to the ACC position. The cam face 84 is formed into a shape suitable for operating the second block lever 20 to the engaged position against the spring force pf the return spring 78 in response to the turning of the cooperative turn shaft 12 from the ACC position to the ON position.

When the cooperative turn shaft 12 is turned to the START position along with the rotor 17 to start the engine, the second solenoid 80 is in the non-energized state and the second block lever 20 is in the disengaged position, in the LOCK position of the cooperative turn shaft 12. When the cooperative turn shaft 12 is turned from the LOCK position to the ACC position, the cam face 84 is brought into abutment against the second block lever 20. When the cooperative turn shaft 12 is further turned from the ACC position to the START position, the second block lever 20 is forcibly turned by the cam face 84 to the engaged position against the spring force of the return spring 78.

Moreover, since the plunger 81 of the second solenoid 80 and the second block lever 20 are operatively connected to each other so that the plunger 81 is operated toward the retracted position in response to the turning operation of the second block lever 20 from the disengaged position to the engaged position, the plunger 81 of the second solenoid 80 is already in the retracted position, before the shift lever is shifted to a drive position or the like other than the parking position to start the energization of the second solenoid 80 after the turning of the cooperative turn shaft 12 to the START position.

Therefore, the second solenoid 80 is merely required to exhibit an electromagnetic force enough to retain the plunger 81 to the retracted position, when the energization of the second solenoid 80 is started by shifting the shift lever to the drive position or the like after starting of the engine. Thus, it is possible to suppress the current consumption by the second solenoid 80 to a small level, and as a result to also suppress the amount of heat generated by the second solenoid 80 to a small level.

When the cooperative turn shaft 12 is operated from the ON position to the ACC position, the engine is stopped, but in this case, if the shift lever is in a position other than the parking position, the second solenoid 80 remains energized, and the plunger 81 remains in the retracted position. As long as the plunger 81 of the second solenoid 80 is in the retracted position, the second block lever 20 cannot be turned toward the disengaged position. Even if an attempt is made to turn the rotor 17 and the cooperative turn shaft 12 from the ACC position to the LOCK position, the turning of the cooperative turn shaft 12 to the LOCK position is inhibited by the abutment of the second block 20 against the restraining face 83.

In this case, if the shift lever is shifted to the parking position, the energization of the second solenoid 80 is stopped and in response to this, the second block lever 20 is returned to the disengaged position by the spring force of the return spring 78, whereby the turnings of the cooperative turn shaft 12 and the rotor 17 from the ACC position to the LOCK position are permitted.

The locking mechanism 14 is switched over between the locking state in which it is in engagement with the steering shaft to inhibit the turning of the steering shaft, and the unlocking state in which it is out of engagement with the steering shaft to permit the turning of the steering shaft. The locking mechanism 14 includes a cam 85 provided at the intermediate portion of the cooperative turn shaft 12, a slider 87 slidably carried in the body 11 and having a through-bore 86 through which the cam 85 is passed, a locking pin 88 connected to the slider 87 and capable of engaging with the steering shaft, and a spring 90 mounted between a cap 89 mounted to the body 11 and the slider 87 to bias the slider 87 in a direction to bring the locking pin 88 into engagement with the steering shaft.

In the locking mechanism 14, when the rotor 17 is in the position other than the LOCK position, i.e., in the ACC position, the ON position or the START position, the lock pin 88 can be disengaged from the steering shaft to permit the turning of the steering shaft. When the rotor 17 is in the LOCK position, the cam 85 is in a turned position in which the slider 87 can be moved by the spring force of the spring 90 so that the locking pin 88 is brought into engagement with the steering shaft.

On the other hand, as the second key slider 72 is slid radially outwards of the rotor 17 by inserting the mechanical key 32 into the keyhole 41 or by pushing in the rotor 17 by the control knob 30, the operating lever 74 is turned in a direction in which its rear end comes closer to the slider 87. However, the slider 87 has an engagement recess 87a provided in its outer side and formed so that the rear end of the operating lever 74 is brought into engagement in the engagement recess 87a to retain the locking mechanism 14 at the unlocking state, when the locking mechanism 14 has been brought into the unlocking state in response to the turning of the rotor 17 to the position other than the LOCK position. Thus, even if the rotor 17 is in the LOCK position, the locking mechanism 14 cannot be brought into the locking state, unless the operating lever 74 is turned in a direction of disengagement of its rear end from the engagement recess 87a by withdrawing the mechanical key 32 from the keyhole 31 or by releasing the pushing-in of the rotor 17.

The rear end of the cooperative turn shaft 12 is connected to an operating member 91 of the rotary switch 13 for relative non-turning about an axis, so that the rotary switch 13 is operated in a switching manner in response to the turning of the operating member provided by the turning of the cooperative turn shaft 12 operatively connected to the rotor 17.

Figure 10:
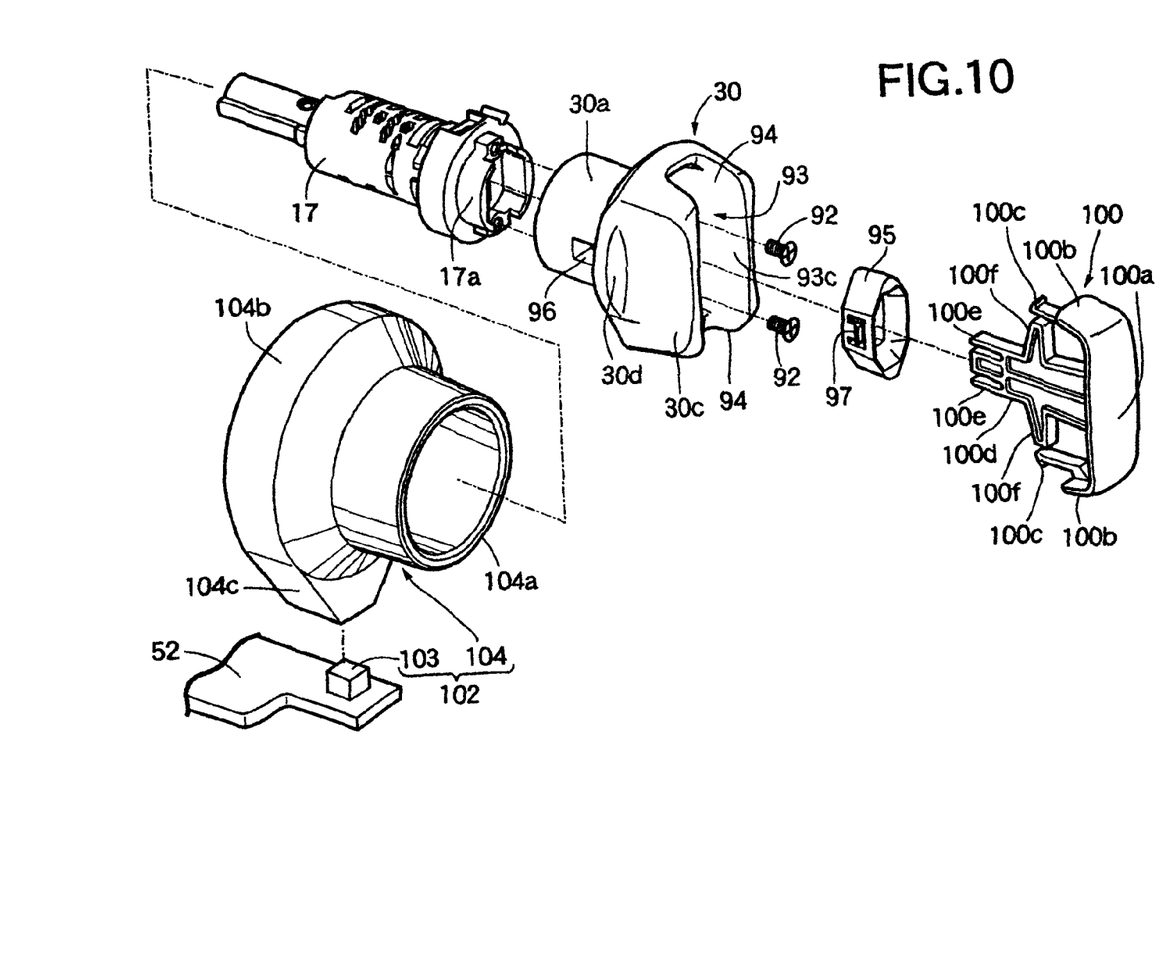
FIG. 10 is an exploded perspective view of a rotor, the control knob, a key guide member, the knob cap and a lens.

Referring also to FIG. 10, the control knob 30 made of a synthetic resin is detachably fastened from axially outside to the front end of the rotor 17, for example, by a pair of screw members 92, 92.

The control knob 30 is integrally provided with a cylindrical tube 30a inserted into the ring member 22, a connecting jaw 30b overhanging radially inwards from an inner surface of the connecting tube 30a closer to the rotor 17, an operating grip 30c which is formed into a rectangular shape to protrude to opposite sides from the connecting tube 30a in one direction along one diametrical line of the connecting tube 30a and which is connected to the connecting tube 30a, and jaws 30d, 30d overhanging to opposite sides from an end of the operating grip 30a closer to the connecting tube 30a in a direction perpendicular to the above-described one direction.

On the other hand, the rotor 17 has a fitting tube 17a at its front end so that the fitting tube 17a is fitted into the fitting tube 30a and abuts against the connecting jaw 30b. The control knob 30 is detachably fastened to the front end of the rotor 17 by threaded engagement between the fitting tube 17a and the pair of screw members 92, 92 inserted through the connecting jaw 30b.

The control knob 30 is also provided with an opening 93 which leads to the keyhole 31 in a state in which the control knob 30 has been fastened to the rotor 17. The opening 93 comprises a key-insertion bore portion 93a defined by an inner periphery of the connecting jaw 30b and opposed to the keyhole 31 at a distance left therebetween, a first mounting bore portion 93b formed within the connecting tube 30a in such a manner that the key-insertion bore portion 93a opens into a central portion of a closed end, and a second mounting bore portion 93c which is formed within the operating grip 30c so that the grip 32a of the mechanical key 32 can be inserted into the second mounting bore portion 93c and which is connected to the first mounting bore portion 93b and opens into the front end of the control knob 30. Moreover, notches 94, 94 are provided respectively in sidewalls of opposite ends of the operating grip 30c of the control knob 30 protruding to opposite sides from the connecting tube 30a so that notches 94, 94 are flush with and lead to an inner side of the second mounting bore portion 93c.

A key guide member 95 as a cover member formed into a ring shape from a synthetic resin, is fitted into the first mounting bore 93b of the opening 93, to cover from outside the pair of screw members 92, 92 for fastening the control knob 30 to the rotor 17, and is provided with an engagement claw 97 adapted to be resiliently engaged into an engagement bore 96 provided in the connecting tube 30a of the control knob 30. Namely, the key guide member 95 is mounted in the first mounting bore portion 93b of the opening 93 in the control knob 30 to cover the screw members 92, 92 from outside.

Moreover, the jaws 30d, 30d of the control knob 30 are formed on the control knob 30 so that the engagement bore 96 faces outwards between the jaws 30d, 30d and the ring member 22, as shown in FIG. 1. The resilient engagement of the engagement claw 97 in the engagement bore 96 can be released by insetting a tool (not shown) into a space between one of the jaws 30d, 30d and the ring member 22, thereby removing the key guide member 95 from the control knob 30. Thus, the key guide member 95 is detachably mounted in the first mounting bore portion 93b of the opening 93 in the control knob 30.

The key guide member 95 is provided with a guide bore 98 for guiding the mechanical key 32 to the keyhole 31 along the key-insertion bore portion 93a. The guide bore 98 comprises a first bore portion 98a extending rectilinearly in correspondence to the key-insertion bore portion 93a of the opening 93 in the control knob 30, and a second bore portion 98b leading to the first bore portion 98a in such a manner that its diameter is increasing in a direction away from the rotor 17.

When the mechanical key 32 is not used, a knob cap 100 made of a synthetic resin is detachably mounted to the control knob 30, so that it is fitted into the opening 93 to close the keyhole 31 from outside, as shown in FIGS. 1 to 3 and 7.

The knob cap 100 is integrally provided with a first cover portion 100a adapted to close an opening in a front end of the second mounting bore portion 93c of the opening 93 in the control knob 30, a pair of second cover portions 100b, 100b leading to opposite ends of the first cove portion 100a to close the notches 94, 94 of the control knob 30, respectively, and engagement claws 100c, 100c connected to tip ends of the second cover portions 100, 100b, respectively, an insertion plate 100d connected perpendicularly to a central portion of the first cover portion 100a in such a manner that it is inserted into the opening in the control knob 30, a pair of plate-shaped resilient portions 100e, 100e provided at a tip end of the insertion plate 100d to resiliently contact with an inner surface f the key-insertion bore portion 93a of the opening 93, and a pair of projections 100f, 100f protruding from an intermediate portion of the insertion plate 100d so that the are opposed to the engagement claws 100c, 100c from inside.

On the other hand, a connection between the connecting tube 30a and the operating grip 30c is provided with a pair of engagement bores 101, 101 for resilient engagement with the engagement claws 100c, 100c. Thus, when the knob cap 100 is inserted into the opening 93 so that the resilient portions 100e, 100e at the tip ends of the knob cap 100 are resiliently brought into contact with the inner surface of the key-insertion bore portion 93a, the engagement claws 100c, 100c are resiliently brought into engagement in the engagement bores 101, 101, whereby the control knob 30 is mounted. Moreover, the first and second cover portions 100a and 100b, 100b of the knob cap 100 are formed so that they are flush with and connected to the outer surface of the control knob 30 in a state in which the knob cap 100 has been mounted to the control knob 30.

The state of the engagement claws 100c of the knob cap 100 engaged in the engagement bores 101 can be released by pushing the engagement claws 100c from outside the operating grip 30c of the control knob 30 using a tool (not shown). That is, the knob cap 100 is detachably mounted to the control knob 30, but an excessive bending of the engagement claws 100c during pushing of the engagement claws 100c by the tool is inhibited by the projections 100f opposed to the engagement claws 100c from inside.

Areas around the control knob 30 and the keyhole 31 are illuminated by an illuminating means 102. The illuminating means 102 is comprised of a light-emitting element 103 such as a light-emitting diode, and a lens 104 for guiding light from the light-emitting element 103.

The light-emitting element 103 is mounted to a front portion of the control substrate 52. The lens 104 comprises a cylindrical portion 104a, a ring portion 104b connected to a rear end of the cylindrical portion 104a and supported on the housing 15, and a light-guiding portion 104c extended from the ring portion 104b toward the light-emitting element 103 to guide the light from the light-emitting element 103.

The cylindrical portion 104a of the lens 104 is inserted into a space between the connecting tube 30a of the control knob 30 and the ring member 22, so that the light emitted from the cylindrical portion 104a is emitted forwards from between the connecting tube 30a and the ring member 22, whereby the entire periphery of the control knob 30 is illuminated. Moreover, when the control knob 30 is viewed from front in a state in which the knob cap 100 has been removed, the area around the keyhole 31 in the rotor 17 is illuminated, because the light from the cylindrical portion 104a of the lens 104 is emitted forwards from the pair of engagement bores 101, 101, as clearly shown in FIG. 4.

The operation of the present embodiment will be described below. When the rotor 17 is turned by the control knob 30, the communication is carried out between the vehicle and the mobile instrument carried by the vehicle user upon the pushing of the control knob 30 conducted as a trigger. In response to the confirmation of the identification of the ID code, the first solenoid 40 for driving the first block lever 19 is operated so as to release the engagement between the first block lever 19 and the lever-engagement groove 37 provided in the cylinder 16 turned along with the rotor 17, whereby the turning operation of the control knob 30 is permitted. In this case, the positioning means 42 is provided between the cylinder 16 and the stationary housing 15 for determining the position of the cylinder 16 around the turning axis so that the clearances between the opposite sides of the first block lever 19 and the sides of the lever-engagement groove 37 are equal when the cylinder 16 is in the LOCK position.

Thus, when the cylinder 16 is brought into the LOCK position, the clearances between the opposite sides of the first block lever 19 and the sides of the lever-engagement groove 37 are determined to be the same by the operation of the positioning means 42. Therefore, it is possible to avoid that the cylinder 16 and the fist block lever 19 are put into abutment against each other upon the operation of the first block lever 19 to the disengaged side, thereby preventing the occurrence of the uneven wear of the cylinder 16 and the first block lever 19. It is also possible to ensure that even if the control knob 30 is turned quickly, the first block lever 19 can be disengaged from the lever-engagement groove 37 before the cylinder 16 collides with the first block lever 19, thereby preventing the occurrence of the uneven wear due to the collision.

Moreover, the positioning means 42 is comprised of the fitting recess 43 of the substantially V-shape provided around the outer periphery of the cylinder 16 and having the inclined faces 43a, 43a on the opposite sides in the circumferential direction of the cylinder 16, the sphere 44 capable of being fitted into the fitting recess 43 while contacting both the inclined faces 43, 43a, and the spring 45 adapted to exhibit the resilient force for biasing the sphere 44 toward the fitting recess 43. The reliable positioning of the cylinder 16 in the LOCK position and the smooth turning of the cylinder from the LOCK position can be achieved by the positioning means 42 of a simple construction.

The rotor 17, to which the control knob 30 is coupled and which is provided with the keyhole 31 into which the mechanical key 32 can be inserted, is provided with the key insertion-restraining means 56 which is adapted to permit the insertion of the mechanical key 32 into the keyhole 31 when the rotor 17 is in the LOCK position, but to inhibit the insertion of the mechanical key 32 into the keyhole 31 when the rotor 17 has been turned from the LOCK position using the control knob 30. Therefore, the mechanical key 32 cannot be inserted erroneously upon the turning of the rotor 17 by the control knob 30, by ensuring that the insertion of the mechanical key 32 into the keyhole 31 is inhibited by the key insertion-restraining means 56 when the rotor 17 has been turned from the LOCK position by the control knob 30. Thus, the possibility of the occurrence of the erroneous motion due to the insertion of the mechanical key 32 can be eliminated.

Moreover, the key insertion-restraining means 56 comprises: the slider 57 which is mounted to the rotor 17 so that it can be slid between the insertion-permitting position for permitting the insertion of the mechanical key 32 into the keyhole 31 and the insertion-inhibiting position for inhibiting the insertion of the mechanical key 32 into the keyhole 31, while being biased toward the insertion-inhibiting position, and so that the urging force from the mechanical key 22 toward the insertion-permitting position is applied to the slider 57 in response to the insertion of the mechanical key 32 into the keyhole 31; and the sliding-movement restraining member 58 which is mounted to the rotor 17 so that the sliding of the slider 57 to the insertion-permitting position is permitted in the state in which the rotor 17 is in the LOCK position, but the sliding of the slider 57 to the insertion-permitting position is inhibited when the rotor 17 has been moved from the LOCK position. That is, the key insertion-restraining means 56 can be constituted simply by the slider 57 and the sliding-movement restraining member 58.

The control knob 30 mounted to the rotor 17 is detachably fastened to the front end of the rotor 17 from axially outside the rotor 17 by the pair of screw members 92, 92. Therefore, the control knob 30 can be removed easily from the rotor 17 by loosening the pair of screw members 92, 92 from outside the control knob 17, thereby facilitating maintenance such as exchange of the control knob 30 and exchange of the ring member 22 located behind the control knob 30.

Moreover, the key guide member 95 is detachably mounted to the control knob 30 to cover the screw members 92 from outside, and hence the appearance can be improved by the covering of the screw members 92.

Further, the opening 93 is provided in the control knob 30 to lead to the keyhole 31 which is provided in the rotor 17 so that the mechanical key 32 can be inserted into the keyhole 31. The key guide member 95 adapted to be inserted into the opening 93 and having the guide bore 98 for guiding the insertion of the mechanical key 32 into the keyhole 31 is detachably mounted to the control knob 30 to cover the screw member 92 disposed in the opening 93. Therefore, the appearance can be further improved, because the screw members 92 and the key guide member 95 are accommodated in the control knob 30, and the insertion of the mechanical key 32 into the keyhole 31 is facilitated by guiding the mechanical key 32 along the guide bore 98 in the key guide member 95.

In addition, the knob cap 100 adapted to be fitted into the opening 93 for closing the keyhole 31 is detachably mounted to the control knob 30, and hence when the mechanical key 32 is not used, the keyhole 31 can be closed by the knob cap 100 so that it is invisible, leading to an improvement in appearance.

The knob cap 100 is formed so that it is flush with the outer surface of the control knob 30 when it has been fitted into the opening 93, whereby in the state in which the knob cap 100 has been mounted to the control knob 30, the united appearance can be provided to the knob cap 100 and the control knob 30, leading to an excellent appearance and a good touch in turning the rotor 17 by the control knob 17.

Further, since the resilient portions 100e, 100e are integrally formed at the tip end of the knob cap 100 to resiliently contact with the inner surface of the end of the opening 93 adjacent the keyhole 31, the knob cap 100 can be guided while providing a moderate resistance feeling during the mounting of the knob cap 100 to the control knob 30, and moreover it is possible to suppress the chattering of the knob cap 100 within the control knob 30 upon the mounting of the knob cap 100 to the control knob 30.

Yet further, the areas around the control knob 30 and the keyhole 31 are illuminated by the illuminating means 102 and hence, the control knob 30 and the keyhole 31 can be visually observed with ease even in the night, whereby the operability of the steerage locking system in the night can be improved.

Although the embodiment of the present invention have been described in detail, it will be understood that the present invention is not limited to the above-described embodiment, and various modifications in design may be made without departing from the spirit and scope of the invention defined in the claims.

What is claimed is:

1. A steerage locking system for a vehicle comprising a control knob mounted to a rotor capable of being turned from a LOCK position via an ACC position and an ON position to a START position, wherein said control knob is detachably fastened from axially outside to a front end of said rotor by a screw member, and wherein a cover member is detachably mounted from outside to said control knob to cover said screw member.

2. A steerage locking system for a vehicle according to claim 1, wherein said control knob has an opening leading to a keyhole which is provided in said rotor so that a mechanical key can be inserted into said keyhole; and said cover member inserted into said opening and having a guide bore for guiding the insertion of said mechanical key into said keyhole is detachably mounted to said control knob to cover said screw member disposed within said opening.

3. A steerage locking system for a vehicle according to claim 1, wherein said rotor having a keyhole, into which a mechanical key can be inserted, is relatively turnably inserted into a cylinder which is turnably carried in a stationary housing; a plurality of tumblers are built in said rotor and biased by a spring in a direction of engagement with the cylinder in such a manner that the engagement with said cylinder is released in response to the insertion of the normal mechanical key into said keyhole; and a key insertion-restraining means is mounted on said rotor and adapted to permit the insertion of said mechanical key into said keyhole in a state in which said rotor is in the LOCK position, but to inhibit the insertion of said mechanical key into said keyhole when said rotor has been turned from the LOCK position using said control knob.

4. A steerage locking system for a vehicle according to claim 3, wherein said key insertion-restraining means comprises: a slider which is mounted to said rotor so that it can be slid between an insertion-permitting position for permitting the insertion of said mechanical key into said keyhole and an insertion-inhibiting position for inhibiting the insertion of said mechanical key into said keyhole, while being biased toward the insertion-inhibiting position, and so that an urging force from said mechanical key toward the insertion-permitting position is applied to the slider in response to the insertion of said mechanical key into said keyhole; and a sliding-movement restraining member which is mounted to said rotor so that the sliding of said slider to the insertion-permitting position is permitted in the state in which said rotor is in the LOCK position, but the sliding of said slider to the insertion-permitting position is inhibited when said rotor has been moved from the LOCK position.

5. A steerage locking system for a vehicle according to claim 1, wherein said control knob has an opening leading to a keyhole which is provided in said rotor so that a mechanical key can be inserted into said keyhole; a knob cap is detachably mounted to the control knob so that it is fitted into said opening to close said keyhole; and a resilient portion is integrally formed at a tip end of said knob cap to resiliently contact with an inner surface of an end of said opening adjacent said keyhole.

* * * * *